Figure 1:
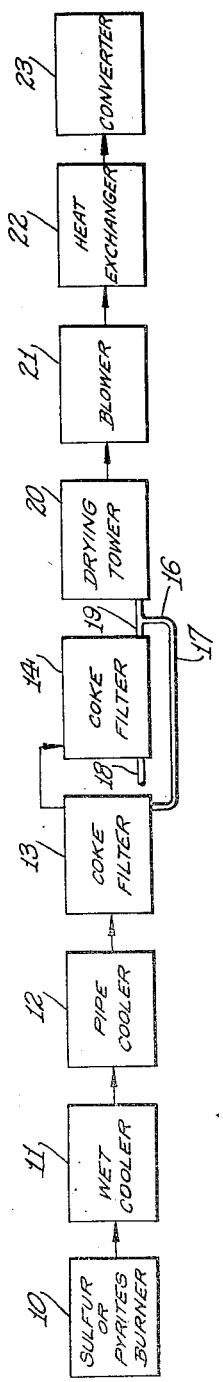

Jan. 30, 1951

J. G. MELENDY
PREVENTION OF MIST FORMATION
IN SULFURIC ACID PLANTS 2,539,519

Filed March 6, 1946

2 Sheets-Sheet 1

INVENTOR
JESSE G. MELENDY
BY Joseph A. Ryan
ATTORNEY

Jan. 30, 1951 — J. G. MELENDY — 2,539,519
PREVENTION OF MIST FORMATION IN SULFURIC ACID PLANTS
Filed March 6, 1946 — 2 Sheets-Sheet 2
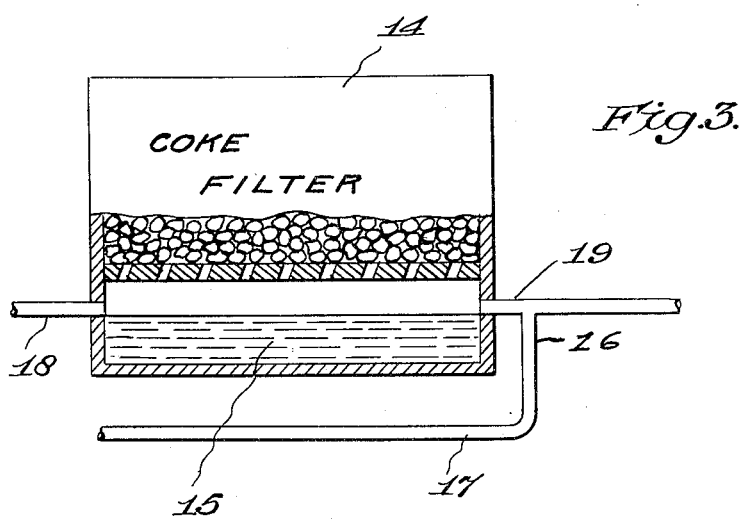
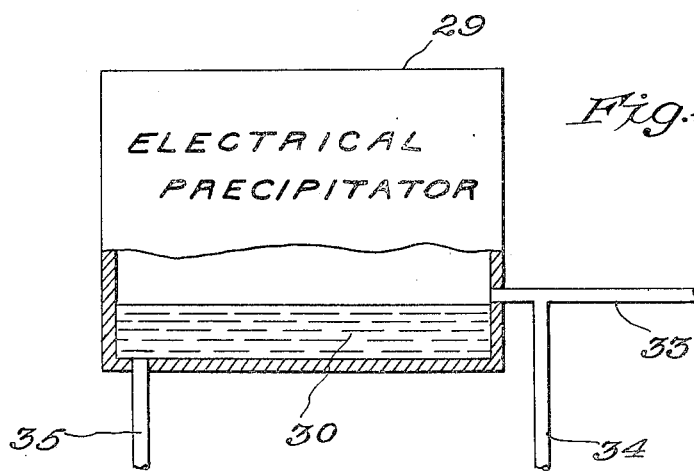
INVENTOR.
JESSE G. MELENDY
BY
*Joseph A. Ryan*
ATTORNEY Patented Jan. 30, 1951

2,539,519

UNITED STATES PATENT OFFICE 2,539,519

PREVENTION OF MIST FORMATION IN SULFURIC ACID PLANTS

Jesse G. Melendy, Tarrytown, N. Y., assignor to Allied Chemical & Dye Corporation, a corporation of New York Application March 6, 1946, Serial No. 652,459

7 Claims. (Cl. 23—167)

This invention relates to the treatment of burner gases, such as produced from sulfur or sulfide ores and other materials used in the manufacture of sulfuric acid by the contact process, to reduce corrosion of the blowers and steel piping employed in contact sulfuric acid plants.

In processes at present commercially used for the manufacture of sulfuric acid by the contact process, hot burner gases containing sulfur dioxide produced by burning sulfurous materials, such as brimstone or pyrites, are prepared for treatment in the converters by passage through a dust chamber, a wet purification system, pipe cooler, coke filter and drying tower. Alternatively, the gas produced by roasting pyrites may be passed through a dust collector, waste heat boiler, cyclone dust separator and thence through the wet purification system, pipe cooler, coke filter and drying tower. The chief function of the coke filter is to remove sulfuric acid mist from the gas, which mist is produced by the partial conversion of the sulfur dioxide to sulfur trioxide in the burner, and subsequent condensation of the sulfur trioxide with the moisture in the gas stream. The removal of sulfuric acid mist minimizes corrosion of the blowers and steel piping through which the gas stream passes in its flow from the drying tower to the converter. Notwithstanding efficient operation of the coke filters to remove substantially all sulfuric acid mist formed, it has been found that corrosion of the blower which pulls the gas through the drying tower and forces it into the converter, and of the steel piping connecting the blower with the drying tower and with the converter system, takes place, requiring relatively frequent repair or replacement of these parts.

Among the objects of this invention is to provide a process of treating burner gases used in the manufacture of sulfuric acid by the contact method which process substantially minimizes or eliminates corrosion of the blower and of the gas flue connecting the dryer with the blower and of the flue connecting the blower with the subsequent equipment leading to the converter. Other objects and advantages of this invention will be apparent from the following detailed description thereof.

The present invention is based upon certain discoveries, the foremost of which is that in the flow of the gas from the mist-remover e. g. the coke filter to the dryer, sulfuric acid mist formation takes place, which mist is not removed in the dryer and causes corrosion of the blower, and the steel gas flues connecting the blower with the dryer and with other equipment in the train leading to the converter system, and that such mist formation can be avoided by lowering the dew-point of the gas just prior to its leaving the mist-remover to a point such that substantially no condensation of moisture takes place in the flue connecting the mist-remover with the dryer. Lowering the dew-point of the gas leaving the mist-remover, from about 1° to 7° F.—preferably from about 3°–7° F., prior to its entry into the flue connecting the mist-remover with the dryer, usually will be sufficient to prevent sulfuric acid mist formation in the gas flue connecting the mist-remover with the dryer; in those cases where the gas leaves the mist-remover at a temperature of about 10° F. above prevailing atmospheric temperature, a lowering of the dew-point of about 3° F. or less, will be found adequate; if the temperature of the gas is as much as 20° F. or more above the prevailing atmospheric temperature, then the dew-point should be lowered more than 3° F., say as much as 7° F.

I have further found that when using an upflow mist-remover, such as an upflow coke filter as frequently used, cooling of the gas inevitably takes place as it flows through the upper portion of the device into the gas exit main, with consequent condensation of water which acts as a catalyst for the oxidation of sulfur dioxide to sulfur trioxide, resulting in the production of sulfuric acid mist which is not removed in the dryer and which causes corrosion of the blower and associated steel piping. In order to prevent sulfuric acid mist formation at minimum expense and with minimum change in existing equipment, it is essential to use a down-draft mist-remover.

In accordance with this invention, residual dust and mist is removed from the gas stream by flowing it downwardly through a mist-remover such as a coke filter or an electrical precipitator, and the exiting gas is caused to flow in contact with sulfuric acid of $H_2SO_4$ strength higher than the $H_2SO_4$ strength of the drip normally produced by such mist-remover under the particular conditions of operation, to thereby lower the dew-point of the gas stream so as to avoid sulfuric acid mist formation in the main or flue connecting the mist-remover with the drying tower. Lowering the dew-point from 1° to 7° F., as above indicated, will be found adequate to prevent sulfuric acid mist formation from taking place in this flue.

Figure 2:
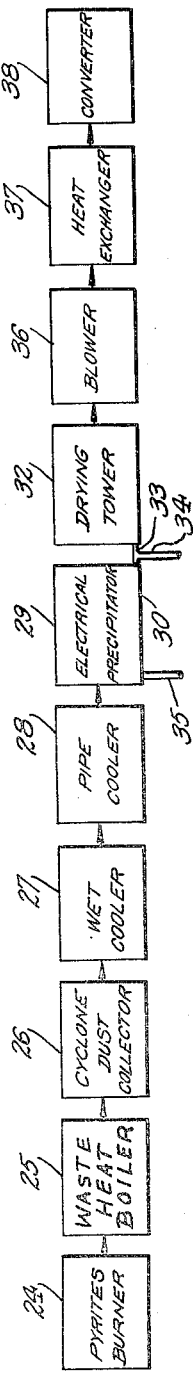

For convenience in describing the invention, reference is made to the accompanying drawing in which Fig. 1 represents diagrammatically a preferred layout of equipment for cooling and purifying burner gases in accordance with the present invention; Fig. 2 represents diagrammatically an alternative arrangement; and Figs. 3 and 4 are enlarged details of apparatus units of Figs. 1 and 2 respectively.

In the drawing, 10 indicates a burner or roaster for producing burner gases by the combustion of sulfurous material such as brimstone or pyrites with air. From the burner or roaster 10, the gases, either with or without a partial precipitation of dust particles in suitable dust chambers, are conducted through a wet cooler 11 consisting of one or more scrubbing towers where the gases are scrubbed with dilute sulfuric acid. From the cooler 11, the gas passes thru a down-draft pipe cooler 12. The gases may enter the wet cooler at a temperature of 700° to 1000° F. and may be cooled therein to a temperature of about 300° F., and may enter the pipe cooler at this temperature and be cooled by indirect heat exchange with water passing on the outside of the pipe cooler to a temperature of about 80° to 100° F. In this cooler a substantial amount of water vapor is condensed and is discharged from the system, thru a suitable draw-off, as weak e. g. 3–4% sulfuric acid. The gas from the pipe cooler 12 containing sulfuric acid in the form of fine mist produced by the partial conversion of the sulfur dioxide to sulfur trioxide in the burner and the subsequent condensation of the sulfur trioxide with the moisture in the system, and usually at a temperature of from 10° to 20° F. above atmospheric, is passed through one or more coke filters 13, 14, to remove this acid mist. For a more detailed description of the structure and operation of the wet cooler, pipe cooler and coke filters, reference may be had to U. S. Patent No. 1,943,137, of January 9, 1934.

In accordance with one modification of the invention, the burner gases are caused to flow through a pair of coke filters 13, 14, in the first of which the gases flow upwardly and in the second, downwardly. If desired, only a single down-draft coke box may be used instead of the two boxes shown. The gases pass downwardly through the bed of coke shown contained in the second coke filter. As the gases leave the second coke filter, they pass over a body of sulfuric acid 15 of $H_2SO_4$ strength substantially greater than the drip produced in the coke filter 14. Under some conditions of operation, this stronger acid may be supplied, for example, by introducing, as at 16 through main 17, the sulfuric acid produced in coke filter 13 into the body of acid 15 in the bottom of coke filter 14, and thereby increasing the strength of the acid, the acid flowing over the bottom of the coke filter 14 in a direction counter-current to the flow of gas and being withdrawn from this filter 14 through line 18. Instead of introducing stronger acid from coke filter 13 into coke box 14, strong acid from an extraneous source may be supplied to the coke filter 14. For example, drying acid produced in the drying tower 20 or strong acid from any suitable source may be flowed over the bottom of the coke filter 14 in a direction counter-current to the flow of gas, the strength of the acid and the time of contact between the acid and gas being such as to lower the dew point of the gas stream enough to prevent sulfuric acid mist formation in the flue 19 connecting the coke filter 14 with the drying tower 20.

From the coke filter 14, the gas flows through drying tower 20, which may be a conventional drying tower in which the gas is contacted with concentrated sulfuric acid to effect removal of moisture from the gas. From this drying tower the gas flows through a blower 21 which pulls the gas through the train of equipment hereinabove described and forces it through a heat exchanger 22 into the converter system 23. The structure and operation of the drying tower 20, blower 21, heat exchanger 22 and converter system 23, are conventional and hence need not be described in further detail.

In the modification of Fig. 2, the $SO_2$ gas produced in the pyrites burner 24 is passed through a waste heat boiler 25 and cyclone dust collector 26. The structure and operation of these units is described in detail in the prior art such, for example, as the MacDonald Patent No. 1,985,902 of January 1, 1935. From the dust collector 26, the gas may pass through a wet cooler 27 similar to wet cooler 11 of Fig. 1, pipe cooler 28 similar to the pipe cooler 12 of Fig. 1, and thence into an electrical precipitator 29 which may be, for example, a well-known Cottrell precipitator for removing residual dust and sulfuric acid mist present in the gas stream.

In accordance with the present invention, the gas flows downwardly through electrical precipitator 29, through the precipitating element not shown contained therein, and as it leaves the precipitator flows over a body of sulfuric acid 30 moving countercurrent to the direction of flow of gas over the base of the precipitator, which acid is of greater strength than the acid drip produced in the precipitator; the strength of the acid and the time of contact between the acid and the gas stream is such as to accomplish a lowering of the dew point of the gas stream adequate to prevent sulfuric acid mist formation in the flue 33 connecting electrical precipitator 29 with the drying tower 32. The strong sulfuric acid may be supplied to the bottom of precipitator 29 from any suitable source as by an inlet pipe 34 opening into flue 33 at a point adjacent the base of the precipitator, the acid being withdrawn from the precipitator through the draw-off 35. From the drying tower 32, the gas flows through blower 36, heat exchanger 37 and converter 38, similar to these units of Fig. 1.

In the operation of the modification of Fig. 2 the sulfur dioxide containing gas is cooled in the waste heat boiler 25 to a temperature of from 600° to 700° F. and at this temperature passes through the dust collector 26 into and through the wet cooler 27 where it is cooled to a temperature of 300° F. It then passes through the pipe cooler 28 where it is cooled to a temperature of about 80° to 100° F. and enters the electrical precipitator 29 at this temperature. The gas leaves the electrical precipitator, its dew-point having been lowered by contact with strong sulfuric acid, as hereinabove described, and flows through the drying tower 32, blower 36, heat exchanger 37 and converter system 38, conditions in which are unchanged from existing present practice except that no sulfuric acid mist is introduced into these units and the connecting piping and hence corrosion difficulties are avoided.

The strength of the acid supplied to the base of the down-draft mist-remover will, of course, vary, depending upon the temperature of the gas stream, the strength of the drip acid produced in the mist-remover with which the gas stream is in equilibrium, prevailing atmospheric temperature conditions, etc. In general, the strength of acid used should be adequate to accomplish a lowering of the dew-point of the gas stream from 1° to 7° F., preferably from 3° to 7° F. In the operation of sulfuric acid plants of the general type to which this invention relates, the $H_2SO_4$ strengths of the drips of the mist-remover may vary within the range of 10-20%, a drip having an $H_2SO_4$ strength of about 15% being a representative average. In carrying out the invention, when it is desired to lower the dew-point of the gas stream in the gas exit flue of the mist-remover 1° F., the pool of acid in the bottom of the down-draft mist-remover should be maintained at a percent $H_2SO_4$ concentration at least 4 in excess of the percent $H_2SO_4$ concentration of the drip produced in the mist-remover under the particular conditions of operation, that is, if a normal drip of the mist-remover has an $H_2SO_4$ strength of 15%, the concentration of the pool of acid in the bottom of the mist-remover should be maintained at not less than 19%. Similarly, when it is desired to lower the dew-point of the gas stream in the exit flue of the mist-remover 3° F., the percent $H_2SO_4$ concentration of the pool of acid in the bottom of the mist-remover should be maintained at least 11 in excess of the percent $H_2SO_4$ concentration of the drip produced, and when it is desired to lower the dew-point 7° F., the percent $H_2SO_4$ concentration of the acid pool should be maintained at least 20 in excess of the percent $H_2SO_4$ concentration of the drip.

According to one example, in operations involving the use of two coke boxes, in the first of which 20° Bé. acid drip (22.3% $H_2SO_4$) is produced and in the second or down-draft box 15° Bé. (16.4% $H_2SO_4$) drip is produced in quantity approximately ¼ that produced in the first box, the temperature of the gas leaving the second box being about 80° F., the introduction of the drip from the first box into the second where is mixes with the drip in the second and flows out of the other end of the second box in a direction countercurrent to the flow of gas thereover, lowers the dew-point of the gas about 1½ F., which if the flue leading to the drying tower is suitably insulated is adequate to prevent sulfuric acid mist formation in this flue. In this instance, the $H_2SO_4$ concentration of the pool of acid in the bottom of the second box was about 21.1%. By using stronger acid and preferably supplying this stronger acid to the mist-remover so that the gas leaving the mist-remover contacts the stronger acid before the latter mixes with the drip in the coke box, the dew-point of the gas may be further reduced.

It will be noted that in accordance with the present invention, the sulfur dioxide gas leaving a down-draft mist-remover is treated to lower its dew-point so as to avoid condensation of moisture in the gas flue leading to the dryer. The condensation of moisture in this flue, I have found, catalyzes the oxidation of sulfur dioxide to sulfur trioxide, resulting in the production of new mist which is not removed in the dryer and causes corrosion of the blower and the flues in the train connecting the dryer with the blower and the blower with the converter system. By preventing the condensation of moisture in the flue connecting the mist-remover with the dryer, I have found new sulfuric acid mist formation is avoided, with consequent elimination of these corrosion difficulties.

Since certain modifications may be made in the manner of carrying out this invention, it is understood that all matter contained in the above description shall be interpreted as illustrative and not in a limiting sense.

I claim:

1. In a process of treating burner gases used in the manufacture of sulfuric acid by the contact process, which gas treating process involves the flow of the burner gases through a cooler, downwardly through a coke filter comprising a coke bed, through a gas flue and thence through a dryer, the improvement which comprises drying the gases by flowing said gases after passage thereof through said coke bed while said gases are in said coke filter and prior to their passage through said gas flue in contact with sulfuric acid of a strength greater than the drip formed in said coke filter thereby to prevent formation of sulfuric acid mist in said gas flue.

2. In a process of treating burner gases used in the manufacture of sulfuric acid by the contact process which gas treating process involves the flow of the burner gases through a cooler, downwardly through an electrical precipitator comprising a precipitating element, through a gas flue and thence through a dryer, the improvement which comprises drying the gases by flowing said gases after passage thereof through said precipitating element, while said gases are in said precipitator and prior to their passage through said gas flue in contact with sulfuric acid of a strength greater than that formed in said precipitator thereby to prevent the formation of sulfuric acid mist in said gas flue.

3. In a process of treating burner gases used in the manufacture of sulfuric acid by the contact process, which gas treating process involves the flow of gases through a wet cooler, pipe cooler, a down-draft coke filter comprising a coke bed, a drying tower and into a converter system, the improvement which comprises drying the gases by flowing said gases after passage thereof through said coke bed, while said gases are in said coke filter and prior to the flow of the gases through the gas flue connecting the downdraft coke filter with the drying tower, in countercurrent flow with a body of sulfuric acid of a strength greater than the drip produced in the coke filter, the strength of the acid and the time of contact between the gas stream and the body of acid being sufficient to lower the dew point of the gas stream from 3° to 7° F.

4. In a process of treating burner gases produced by roasting pyrites for use in the manufacture of sulfuric acid by the contact process, which gas-treating process involves the flow of gases through a waste heat boiler, a cyclone dust collector, a wet cooler, a pipe cooler, a down-draft electrical precipitator comprising a precipitating element, a drying tower and into the converter system, the improvement which comprises drying the gases by flowing said gases after passage thereof through said precipitating element, while said gases are in said electrical precipitator and prior to the flow of gases through the gas flue connecting the electrical precipitator with the drying tower, in contact with a body of sulfuric acid of a strength greater than the drip acid produced in the precipitator, the strength of the body of sulfuric acid and the time of contact between the acid and the gases being sufficient to lower the dew point of the gases from 3° to 7° F.

5. In a process of treating burner gases used in the manufacture of sulfuric acid by the contact process, which gas treating process involves the flow of gases through a wet cooler, pipe cooler, a down-draft coke filter comprising a coke bed, a drying tower and into a converter system, the improvement which comprises drying the gases by flowing said gases after passage thereof through said coke bed, while said gases are in said coke filter and prior to the flow of the gases through the gas flue connecting the downdraft coke filter with the drying tower, in countercurrent flow with a body of sulfuric acid maintained at a percent $H_2SO_4$ concentration at least 4 in excess of the percent $H_2SO_4$ concentration of the drip produced in said filter.

6. In a process of treating burner gases used in the manufacture of sulfuric acid by the contact process, in which gas treating process the gases are passed through a cooler, through a mist-remover containing a mist-removing element, through a gas flue and thence through a dryer, the improvement which comprises reducing the moisture content of the gases, after passage thereof through said mist-removing element, while said gases are in said mist-remover and prior to their entry into the gas flue connecting the mist-remover with the dryer, to an extent sufficient to lower the dew point of the gases from 3° to 7° F., thereby to avoid condensation of moisture in said gas flue and prevent the formation of any sulfuric acid mist in the gases prior to their entry into said dryer.

7. In a process of treating burner gases used in the manufacture of sulfuric acid by the contact process, in which gas treating process the gases are passed through a cooler, downwardly through a mist-remover containing a mist-removing element, through a gas flue and thence through a dryer, the improvement which comprises drying the gases by flowing said gases, after passage thereof through said mist-removing element while said gases are in said mist-remover and prior to their passage through said gas flue, in contact with sulfuric acid of a strength greater than the drip formed in said mist-remover thereby to prevent formation of sulfuric acid mist in said gas flue.

JESSE G. MELENDY.

REFERENCES CITED

The following references are of record in the file of this patent:

UNITED STATES PATENTS

| Number | Name | Date |
|---|---|---|
| 1,789,460 | Clark | Jan. 20, 1931 |
| 1,882,206 | Clark | Oct. 11, 1932 |
| 1,896,287 | Clark | Feb. 7, 1933 |
| 1,915,270 | Clark | June 27, 1933 |
| 1,943,137 | Mullen | Jan. 9, 1934 |
| 2,017,676 | Von Girsewald et al. | Oct. 15, 1935 |
| 2,071,598 | Von Girsewald et al. | Feb. 23, 1937 |